US011297571B2

(12) United States Patent
Feng et al.

(10) Patent No.: US 11,297,571 B2
(45) Date of Patent: Apr. 5, 2022

(54) CONTROLLING END NODES OF A LOW-POWER WIDE AREA NETWORK (71) Applicant: SIGNIFY HOLDING B.V., Eindhoven (NL)

(72) Inventors: Lei Feng, Eindhoven (NL); Xiaobo Jiang, Eindhoven (NL); Shengli Zhang, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 95 days.

(21) Appl. No.: 16/632,553

(22) PCT Filed: Jul. 17, 2018

(86) PCT No.: PCT/EP2018/069411
§ 371 (c)(1),
(2) Date: Jan. 21, 2020

(87) PCT Pub. No.: WO2019/016216
PCT Pub. Date: Jan. 24, 2019

(65) Prior Publication Data
US 2020/0245244 A1 Jul. 30, 2020

(30) Foreign Application Priority Data

Jul. 21, 2017 (WO) ................ PCT/CN2017/093934
Aug. 31, 2017 (EP) .................................... 17188869

(51) Int. Cl.
H04W 52/02 (2009.01)
(52) U.S. Cl.
CPC ... H04W 52/0219 (2013.01); H04W 52/0235 (2013.01)

(58) Field of Classification Search
CPC ............... H04W 4/70; H04W 52/0219; H04W 52/0235; Y02D 30/70
See application file for complete search history.

(56) References Cited

U.S. PATENT DOCUMENTS 7,112,273 B2 * 9/2006 Weigel .................... A61M 1/16
                                                    137/100
8,605,853 B2 * 12/2013 Schultz ................ H03K 23/548
                                                    377/118

(Continued)

FOREIGN PATENT DOCUMENTS

CN          106254239 A         12/2016
CN          106685855 A          5/2017

(Continued)

OTHER PUBLICATIONS

Dae-Young Kim, et al., "Adaptive Data Rate Control in Low Power Wide Area Networks for Long Range IoT Services", Journal of Computational Science, 2017, pp. 1-8.

Primary Examiner — Parth Patel
Assistant Examiner — Berhanu D Belete (57) ABSTRACT The invention provides a method and apparatus for managing end nodes of a Low-Power Wide Area Network. A mode change command indicating a desire to switch the operating mode of each of a plurality of end nodes is broadcast. A determination is made as to whether all the end nodes have switched mode to match the desired operating mode, and the mode change command is rebroadcast if it is determined that not all end nodes have appropriately switched mode.

15 Claims, 5 Drawing Sheets (56) References Cited

U.S. PATENT DOCUMENTS

| | | | |
|---|---|---|---|
| 10,672,242 B2* | 6/2020 | Jenkins | G08B 21/0244 |
| 2010/0165866 A1* | 7/2010 | Sachse | H04W 24/08 |
| | | | 370/252 |
| 2010/0219789 A1* | 9/2010 | Bermak | G01L 1/26 |
| | | | 320/101 |
| 2011/0026434 A1* | 2/2011 | Van Der Stok | G01S 5/0289 |
| | | | 370/254 |
| 2012/0025717 A1* | 2/2012 | Klusmann | H05B 47/11 |
| | | | 315/152 |
| 2013/0137413 A1* | 5/2013 | Jayachandran | H04W 8/22 |
| | | | 455/418 |
| 2013/0272125 A1 | 10/2013 | Espina Perez et al. | |
| 2015/0036545 A1* | 2/2015 | Lee | H04L 45/48 |
| | | | 370/256 |
| 2015/0127251 A1* | 5/2015 | Chen | G01C 21/206 |
| | | | 701/487 |
| 2017/0109985 A1* | 4/2017 | Jenkins | G08B 21/0225 |
| 2017/0127403 A1 | 5/2017 | Sapio et al. | |
| 2017/0214599 A1* | 7/2017 | Seo | H04L 41/0816 |
| 2017/0230907 A1* | 8/2017 | Rose | H04W 52/0277 |
| 2018/0129493 A1* | 5/2018 | Deixler | H04L 12/2816 |

FOREIGN PATENT DOCUMENTS

| | | |
|---|---|---|
| EP | 2339883 B1 | 3/2013 |
| WO | 2017009686 A1 | 1/2017 |

* cited by examiner

CONTROLLING END NODES OF A LOW-POWER WIDE AREA NETWORK

CROSS-REFERENCE TO PRIOR APPLICATIONS

This application is the U.S. National Phase application under 35 U.S.C. § 371 of International Application No. PCT/EP2018/069411, filed on Jul. 17, 2018, which claims the benefits of European Patent Application No. 17188869.6, filed on Aug. 31, 2017, and Chinese Patent Application No. PCT/CN2017/093934, filed on Jul. 21, 2017. These applications are hereby incorporated by reference herein.

FIELD OF THE INVENTION

This invention relates to the field of wireless wide area network technology, and in particular to methods of controlling nodes of low-power wide area networks.

BACKGROUND OF THE INVENTION

A Low-Power Wide Area Network (LPWAN) has been proposed to fill a technological gap that exists between the well-known technologies of wireless sensor networks and wide area networks. A LPWAN is a wireless wide area network technology specialized for interconnecting devices with only a low bit-rate communication capability, over a wide area and with low cost. Typically, a LPWAN is used for battery powered devices, resource-restricted units, or power-harvesting devices, such as solar-powered devices.

Popular LPWAN technologies include, for cellular applications, the NarrowBand IoT (NB-IoT) radio technology standard or the enhanced Machine Type Communications (eMTC) protocol. Another popular LPWAN technology is LoRaWAN.

In LPWANs, there has been a growing trend in reducing the power consumption of the end nodes, e.g. to improve a battery life, and minimizing traffic. In pursuit of these aims, the LPWAN protocol been optimized for uplink-critical systems, being systems which primarily rely on end nodes passing information to a network controller. In such systems, there is little need for end nodes to be configured to receive data.

There has been a growing interest in using LPWAN technology in new industries, especially the automotive, utility (e.g. lighting or water), agricultural and health industries. In these applications, end nodes of a LPWAN consist of peripheral input and/or output devices, and may include, for example, water meters, gas detectors, car monitoring systems, personal healthcare monitoring products and/or wireless luminaires. Typically, end nodes are unable to route received information to other devices in the LPWAN.

As LPWAN systems grow in size and complexity, there is an increasing demand on the traffic load and traffic flow. The growing use of LPWAN in different industries has also increased the demand for configurability and control of end nodes.

SUMMARY OF THE INVENTION

The invention is defined by the claims.

Examples in accordance with an aspect of the invention provide a method of managing a plurality of end nodes of a Low-Power Wide Area Network, LPWAN, wherein each end node is switchable between at least two operating modes. The method comprises: broadcasting a mode change command to the plurality of end nodes, wherein the mode change command indicates a desired operating mode of the plurality of end nodes. The method also comprises determining whether each of the plurality of end nodes has successfully switched into the desired operating mode in response to the mode change command; and in response to the detector determining that not all end nodes have switched into the desired mode, rebroadcasting the mode change command.

An operating mode of an end node may define what tasks that end node is able to perform. In particular, an end node may only be able to perform particular tasks or only have certain capabilities (such as configurability, diagnosis or reporting) when operating in a particular operating mode.

Proposed embodiments allow for control of an operation of end nodes by a network controller. In particular, a network controller may broadcast a mode change command to instruct the end nodes to switch to a desired mode.

Concepts allow for a network controller to check whether an end node has adhered to this request to change operating mode. Such a checking system increases the likelihood that an end node is correctly placed in an appropriate mode for performing a particular task. Thus, control over an operation of end nodes may be provided with a high degree of reliability.

A plurality of end nodes is simultaneously issued the mode change command, as this is broadcast to all the end nodes in the plurality of end nodes (rather than individually unicast). This could allow, for example, an amount of traffic of the LPWAN to be reduced, reducing the likelihood of package collision and thereby lost data.

The method may further comprise broadcasting the mode change command a predetermined number of times, wherein the predetermined number is calculated based on at least one characteristic of the LWPAN, such as the packet loss rate.

By repeatedly broadcasting the mode change command (i.e. a single step of broadcasting a mode change command comprises multiple sub-steps of broadcasting a mode change command) a likelihood of an end node successfully receiving the mode change command is significantly increased. Thus a reliability of end node control is improved.

The method preferably further comprises receiving information from the plurality of end nodes at a network controller. The received information may be used to determine whether the end nodes have correctly adhered to the mode change command.

Optionally, the at least two operating modes comprise at least: a first operating mode in which the end node primarily transmits first information, generated at the end node, to a network controller; and a second operating mode in which the end node does not or is unable to transmit the first information to the network controller.

Thus, the end nodes may be operable in at least a transmitting mode (first operating mode) and a restricted transmission mode (second operating mode). Preferably, the end node may be unable to transmit particular information (e.g. status information) when operating in the restricted transmitting mode, but is capable of transmitting such information when operating in the transmitting mode. This allows for a reduction in traffic and a reduced risk of packet collision and packet loss, as the method allows end nodes to be switched to a restricted transmission mode (second operating mode) to thereby reduce an amount of additional traffic in the LPWAN by preventing or otherwise prohibiting transmission of particular information.

Preferably, when in the second operating mode, the end node is adapted to receive second information transmitted by the network controller. Thus, the second operating mode (restricted transmission mode) may be a configuration or receiving mode. Even more preferably, an end node operating in a transmitting mode may be unable to receive certain information, such as that received from a network controller.

In some embodiments, the end node may be adapted to only be able to transmit first information (i.e. particular information) when operating in the first operating mode, and/or only be able to receive second information when operating in the second operating mode. The end node may be adapted to receive the mode change command when operating in any mode, so as to allow the mode of the end node to be dynamically changed by the network controller.

In some embodiments, if the mode change command indicates a desire to switch from the first operating mode, the method comprises determining whether any one or more of the plurality of end nodes continues to transmit first information to the network controller, so as to determine whether each of the plurality of end nodes has successfully switched from the first operating mode to the desired operating mode.

In some embodiments, if the mode change command indicates a desire to switch to the first operating mode, the method comprises determining whether any one or more of the plurality of end nodes has failed to transmit first information to the network controller within a predetermined time window, so as to determine whether each of the plurality of end nodes has successfully switched to the desired operating mode.

Thus, an absence or presence of first information may be used to determine whether end nodes have correctly switched into or out of a first operating mode. This advantageously allows a passive determination of whether an operating mode of end nodes has been successfully switched, without the need for directly requesting or addressing each individual end node. This allows an amount of traffic in the LPWAN may be reduced.

In at least one embodiment, if the mode change command indicates a desire to switch the plurality of end nodes to the second operating mode, an end node operating in the second operating mode being adapted to receive second information from the network controller, the method further comprises: transmitting second information to each of the plurality of end nodes; broadcasting a second mode change signal command, the second mode change signal command indicating a desire to switch the end node to the first operating mode; receiving first information from each of the plurality of end nodes; determining, based on the received first information, whether the second information was correctly received by each of the plurality of end nodes.

Thus, first information received from the end nodes may be used to verify that the second information was correctly received and/or processed by the end nodes. This allows for a check of the success in transferring second information to the end nodes to be performed passively (i.e. without an explicit request from the network controller).

According to another aspect of the invention, there is provided a network controller for managing a plurality of end nodes of a Low-Power Wide Area Network, LPWAN, wherein each end node is switchable between at least two operating modes, the network controller comprising: a transmitter configured to broadcast at least a mode change command to the plurality of end nodes, wherein the mode change command indicates a desired operating mode of the plurality of end nodes; a receiver adapted to receive data from the plurality of end nodes; and a detector configured to determine whether each of the plurality of end nodes has successfully switched into the desired operating mode in response to the mode change command, wherein, in response to the detector determining that not all end nodes have switched to the desired mode, the transmitter is configured to rebroadcast the mode change command.

The transmitter may be configured to broadcast the mode change command a predetermined number of times, wherein the predetermined number is calculated based on at least a characteristic of the LWPAN, such as a packet loss rate.

Preferably, the network controller further comprises a receiver adapted to receive data from the plurality of end nodes.

The at least two operating modes of the end nodes may comprise at least a first operating mode in which the end node transmits first information, generated at the end node, to the network controller; and a second operating mode in which the end node does not transmit the first information to the network controller.

In at least one embodiment, if the mode change command indicates a desire to switch from the first operating mode, then the detector is adapted to determine whether any one or more of the plurality of end nodes continues to transmit first information to the network controller, so as to determine whether each of the plurality of end nodes has successfully switched to the desired operating mode.

The network controller may be adapted wherein, if the mode change command indicates a desire to switch to the first operating mode: the detector is adapted to determine whether any one or more of the plurality of end nodes has failed to transmit first information to the network controller within a predetermined time interval, so as to determine whether each of the plurality of end nodes has successfully switched to the desired operating mode.

Preferably, the network controller is for a LPWAN wherein each end node comprises a luminaire adapted to output light and the first information comprises a light control signal for controlling an output light of the luminaires of the end nodes.

According to a further aspect of the inventive concept, there is proposed an end node for a Low-Power Wide Area Network, LPWAN, comprising: a receiver adapted to receive at least a mode change command from a network controller as described above; a transmitter adapted to transmit data to the network controller; and a processor adapted to switch the end node between at least two operating modes based on the mode change command, wherein the end node is switchable between at least: a first operating mode in which the end node primarily transmits first information, generated at the end node, to the network controller; and a second operating mode in which the end node does not transmit the first information to the network controller.

Preferably, the end node is a luminaire adapted to output light (e.g. using at least a lamp). Second information received from the network controller may control output characteristics of the light output by the luminaire, such as intensity, color, temperature, angle, dispersion characteristics, shape, number of active lamps, on/off state and so on.

There is also proposed the concept of a Low-Power Wide Area Network comprising any network controller previously described and a plurality of end nodes as previously described.

In a particularly preferable embodiment, the Low-Power Wide Area Network is for a lighting system, wherein each end node comprises a luminaire. In such embodiments, the operating modes of each end node (i.e. each luminaire) may include at least: a transmitting mode, in which an end node regularly transmits status information of the end node (e.g. voltage, current, temperature and so on); and a restricted transmission mode, wherein the regular transmission of the status information is stopped or paused, and the end node is able to transmit only critical information such as alarms. Such an embodiment will significantly reduce a power consumption of the end nodes and allows for a high level of control over the traffic flow within the LPWAN. For example, the network controller may switch the end nodes to the second operating mode if a total amount of traffic in the LPWAN is above a predetermined amount. In another example, the network controller switches the end nodes to the second operating mode if there is a desire or requirement to transmit a mass of data from the network controller to the end nodes (e.g. scheduling updates or calendar information of the luminaires). There is also proposed the concept of a computer program comprising code means for implementing the method of any described method when said program is run on a computer.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a method and apparatus for managing an operation of end nodes of a Low-Power Wide Area Network. A mode change command is broadcast indicating a desire to switch the operating mode of each of a plurality of end nodes. A determination is made as to whether all the end nodes have switched mode to match the desired operating mode, and the mode change command is rebroadcast if it is determined that not all end nodes have appropriately switched mode.

Embodiments are at least partly based on the realization that end nodes of a Low-Power Wide Area Network may be operable in a plurality of modes to allow them to perform different tasks. A network controller is provided to control and command the switching of operating modes of the end nodes, and concepts provide reliable determination as to whether an operating mode has been correctly switched.

Illustrative embodiments may, for example, be employed in Low-Power Wide Area Networks, and are particularly advantageous in a distributed lighting system, such as a street or infrastructure lighting system.

Figure 1:
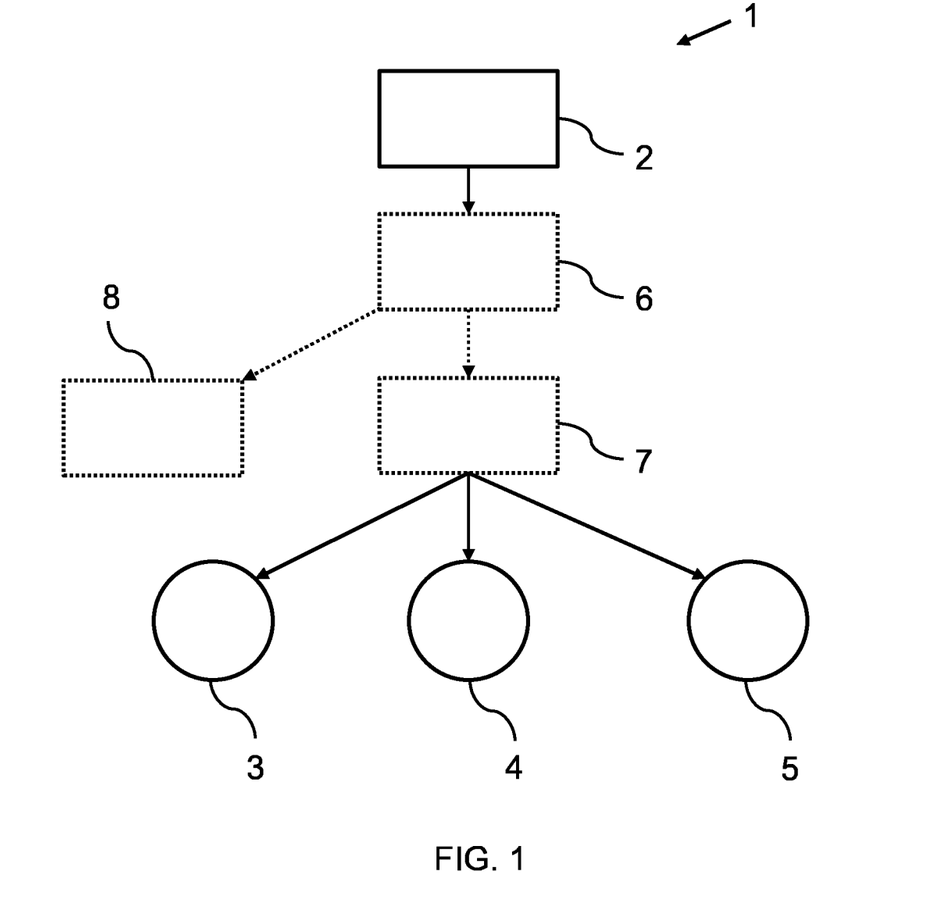
FIG. 1 shows a Low-Power Wide Area Network (LPWAN) comprising a network controller according to an embodiment.

FIG. 1 illustrates a network controller 2, according to a general embodiment, in the context of a Low-Power Wide Area Network (LPWAN) 1. Suitable LPWAN protocols in which the described devices operate are widely known in the technical field.

The LPWAN comprises the network controller 2 and a plurality of end nodes 3, 4, 5, each end node being managed by the network controller 2. Preferably, each end node is managed in a same manner as other end nodes. For example, each end node may represent a street light of a street lighting network, wherein each street light needs to be controlled to operate in a same manner.

The network controller 2 communicates with the end nodes over a wireless communication channel. In some embodiments, the network controller communicates with the end nodes via intermediary devices, such as a network server 6 and/or gateways 7, 8. Such intermediary devices may, for example, be operated or owned by a different party to the owner/operator(s) of the network controller 2 and/or end nodes 3, 4, 5.

The end nodes 3, 4, 5 do not necessarily communicate with only a single gateway 7. Rather, messages from end nodes 3, 4, 5 can be sent via any one or more gateways of the LPWAN, such as gateway 7 and/or gateway 8, to the network server 6 and network controller 2. The network server 6 and/or the network controller 2 are adapted to handle any duplicated messages received from a plurality of gateways. In other embodiments, the network controller communicates directly with the end nodes, i.e. there are no intermediary devices.

Each end node 3, 4, 5 is operable in a plurality of operating modes. For example, each end node may be able to run at least two different programs or sub-routines, each associated with a respective operating mode. That is, a first operating mode may be associated with a first program/sub-routine, and a second operating mode may be associated with a second program/sub-routine.

The network controller 2 controls the operating mode of the plurality of end nodes to thereby manage the operation of the plurality of end nodes.

Figure 2:
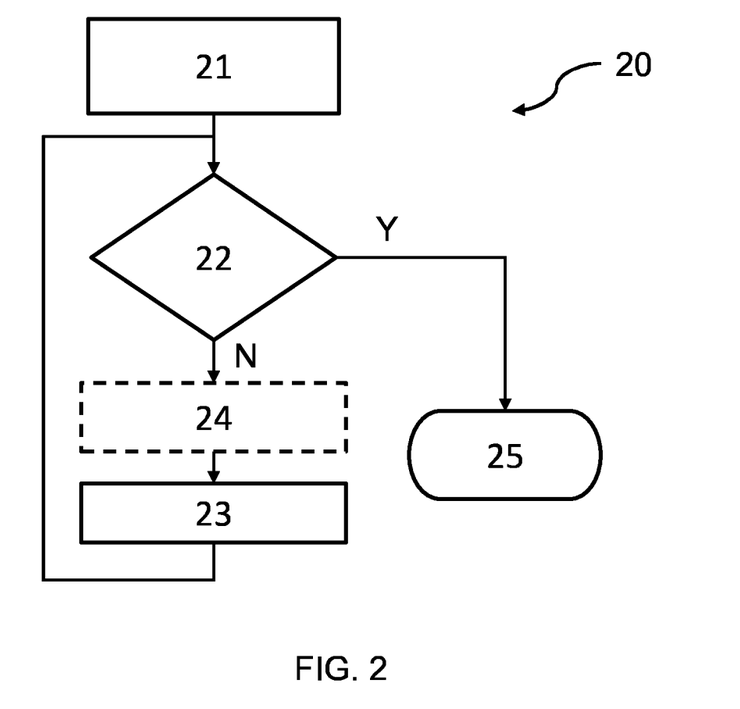
FIG. 2 illustrates a method for managing a plurality of end nodes according to an embodiment.

FIG. 2 illustrates a method 20 of managing the plurality of end nodes 3, 4, 5 according to an embodiment. This method is carried out by the network controller 2.

The method 20 comprises broadcasting 21 a mode change command to the plurality of end nodes 3, 4, 5. The mode change command indicates a desired operating mode of the plurality of end nodes 3, 4, 5. By way of example, the mode change command may be an instruction for each end node to switch mode, or may be an instruction for each end node to enter into a particular, specified operating mode.

The method further comprises determining 22 whether each of the plurality of end nodes has been switched into or is operating in the desired operating mode. Thus, the method checks whether each end node has obeyed the mode change command.

In response to determining that not all end nodes have switched to the desired operating mode (e.g. due to transmission failure or corrupted data receipt by an end node), the method comprises rebroadcasting 23 the mode change command. The determining 22 whether each of the plurality of end nodes has been correctly switched is then repeated.

There may be a delay 24 between determining 22 whether all end nodes have switched and rebroadcasting 23 the mode change command. That is, the method 20 may comprise waiting 24 a first predetermined time interval (T1), i.e. length of time, e.g. 15 minutes or 20 minutes, before rebroadcasting 23 the mode change command. This time limit may allow, for example, for end nodes which are only sporadically active (e.g. extremely low power devices or power harvesting devices) to respond to the mode change command. Such a time limit may also avoid a packet collision with messages having a greater priority (e.g. an alarm from the end nodes).

The first predetermined time period T1 may be estimated according to an average transmission interval of an end node (i.e. the average time between the network controller receiving a communication from an end node). For example, end nodes may be adapted to periodically transmit information to the network controller. This period may be used to determine the first predetermined time period. For example, the first predetermined time period may approximate the average interval between the network controller receiving a communication from any one or more of the end nodes.

In response to determining that all end nodes have correctly/successfully switched to the desired operating mode, the method 20 ends 25.

Thus, the method 20 generally comprises instructing end nodes to switch operating mode, checking that the end nodes have correctly switched operating mode and, if the end nodes have not correctly switched operating mode, re-instructing the end nodes to switch operating mode.

The proposed method ensures that the end nodes have correctly switched operating mode, and reduces a likelihood that transmission failures cause incorrect operation of the LPWAN and the end nodes in particular.

Figure 3:
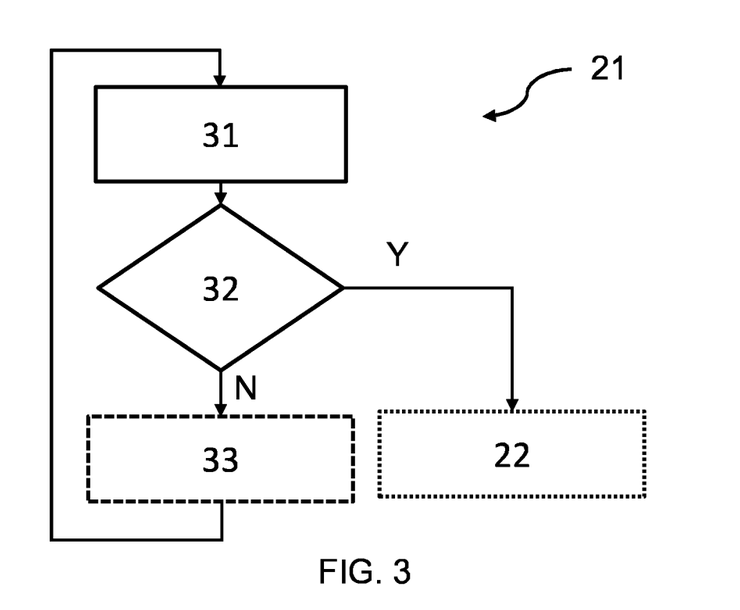
FIG. 3 illustrates a method of broadcasting a mode change command to the plurality of end nodes according to an embodiment.

FIG. 3 illustrates a slight modification to the method 20 described in FIG. 2. In particular, FIG. 3 illustrates a modified step 21 of broadcasting the mode change command to the plurality of end nodes 3, 4, 5 according to an embodiment.

The overall step 21 of broadcasting comprises a sub-step 31 of broadcasting the mode change command.

The broadcasting 21 also comprises a sub-step 32 of determining whether the mode change command has been broadcast at least a first predetermined number (P1) of times, within the overall step of broadcasting 21.

In the event that the mode change command has not been broadcast at least the first predetermined number of times (P1), the step 21 of broadcasting returns to the sub-step 31 of broadcasting the mode change command so as to broadcast the mode change command again. Optionally, the step 21 of broadcasting comprises a sub-step 33 of waiting for a second predetermined time interval (T2) or length of time after it has been determined that the mode change command has not been broadcast at least P1 times.

In the event that the mode change command has been broadcast at least P1 times, the overall step 21 of broadcasting ends, and the method moves to the step 22 of determining whether each end node has successfully switched into the desired operating mode (defined by the mode change command).

Thus, a broadcast of the mode change command is repeated a first predetermined number of times (P1) before it is checked whether each end node has obeyed the mode change command. There may be a second predetermined time interval (T2) between each broadcast.

It will be apparent that the step of rebroadcasting 23 the mode change command may comprise similar sub-steps 31, 32 and 33 of broadcasting the mode change command, determining, whether the mode change command has been broadcast (in the overall step of rebroadcasting 23) a first predetermined number of times, and waiting for a predetermined interval.

The first predetermined number of times (and/or other predetermined number of times described throughout) is preferably determined based on characteristics of the LWPAN. These characteristics may, for example, comprise a packet loss rate of the network (e.g. the probability that a packet will be lost in transmission).

This packet loss rate may be estimated using various features of the LWPAN, including a throughput and traffic load of the network. The traffic load depends upon the system design (e.g. an end node reporting time, length of packet communication, and bit-rate of the communication) and the throughput may depend upon wireless channel access control mechanism. Using the throughput of the system and the traffic load, the packet loss may be estimated.

In some embodiments, a packet loss rate may be estimated by performing a ping operation from the network controller to other nodes, e.g. end nodes, in the LWPAN. This may include repeatedly pinging an end node to determine an average packet loss rate (i.e. determine a proportion of pings that receive a response). A ping operation may also be used to measure the round trip time for messages or data flow.

In some embodiments, a packet loss rate may be estimated by counting a sequence or number of daily operational messages received from the end nodes.

A more accurate estimation of the packet loss rate may be calculated, for example, by further using other characteristics of elements of the network, for example, a sensitivity of a receiver of the end node or a reliability of a transmitter of the network controller.

The greater the packet loss rate, the greater the (first or other) predetermined number of times. It would be preferred to ensure that the overall probability of successfully broadcasting a communication, such as the mode change command using the method of FIG. 3, to an end node is greater than 0.95, for example, greater than 0.99, for example, greater than 0.999, for example, greater than 0.9999.

By way of example, if it is calculated that the packet loss rate is around 24.3% (i.e. the probability of successful transmission of a broadcast is around 0.757), a broadcast of a communication such as the mode change command will have to be repeated 5 times to ensure the probability of successful transmission to an end node is greater than 0.999 and 7 times to ensure the probability of successful transmission to an end node is greater than 0.9999.

The optional step of waiting 33 a second predetermined time interval T2 may comprise waiting for a period between 5 and 30 seconds. For example, the second predetermined time interval T2 may be around 20 seconds. Preferably, the second predetermined time interval T2 is greater than a round trip time of the LPWAN (e.g. a time for data to pass from the end node to the network controller and back again or vice versa). Even more preferably, the second predetermined time interval may be more than several times greater than the round trip time of the LPWAN to avoid a packet collision with messages having a greater priority (e.g. an alarm from the end nodes). As such high-priority messages may be transmitted several times in succession (as will be explained later), it is particularly advantageous to avoid packet collision with each of these successively broadcast messages.

Thus, the second predetermined time period T2 may be larger than a length of time for an end node to transmit time-critical information (such as alarm data). For example, if end nodes are adapted to transmit alarm data 3 times within 15 seconds, T2 should be bigger than 15 seconds, or more preferably 20 seconds. This will avoid conflict or packet collision with these time critical messages.

A round trip time of the LPWAN may be measured, for example, by performing a (dedicated) ping operation or by monitoring a time for an end node to respond to a broadcast/ multicast/unicast operation. For example, end nodes may be required to acknowledge a unicast from the network controller, such that a time delay between unicasting a message to the end node and receipt of the acknowledgement may represent a round trip time of the LPWAN. The predetermined time interval(s) may dynamically change based on a change in the round trip time (e.g. caused by a network becoming more congested).

Preferably, the second predetermined time interval T2 (between repetitions 31 within a single broadcasting step 21) is less than the first predetermined time interval (between different broadcasting steps 21, 23). This will help improve the likelihood that sporadically active end nodes will receive the mode change command. For improved simplicity however, the second predetermined time interval T2 may be equal to the first determined time period.

The above described methods ensure that end nodes of a LPWAN are reliably controlled by the network controller, as a probability of successful transmission of the mode change command is significantly improved, and a check is made as to whether the mode change command has been carried out.

The following described embodiments relate to optimization of the method for controlling end nodes operable in particular operating modes, although concepts may be applied more generally.

In particular, to assist in controlling the uplink/downlink data flow to each end node, each end node 3, 4, 5 is operable in at least two operating modes. Each operating mode is associated with a capability of the end node to receive/transmit data of a particular type.

End nodes operable in a plurality of operating modes are particularly advantageous for LPWANs of lighting systems, as such lighting systems typically comprise a large number of similar end nodes such as street lights or building lights. Such embodiments benefit particularly from being controlled in a same manner.

In order to determine in step 23 whether an end node 3, 4, 5 is operating in a desired operating mode, the network controller 2 may determine whether particular data is being transmitted (or no longer transmitted) by the end node.

For example, if an end node is only able to transmit first information when in a first operating mode, the presence of first information is indicative that the first operating mode has been entered, and the absence of first information may be indicative that the end node has exited the first operating mode.

In another example, if an end node is only able to receive second information when in a second operating mode, presence of an acknowledgement signal (if provided) by the end node of receipt of the second information may indicate that the end node is operating in the second operating mode.

To improve an understanding of these envisaged operating modes of the end nodes, it is helpful to understand what data is envisaged to flow between the network controller 2 and the plurality of end nodes 3, 4, 5 in a specific embodiment. In particular, this data may fall into a number of types, where successful transmission/receipt (between the network controller and end nodes) of some of these types is dependent upon an operating mode of the end nodes.

Envisaged data types include at least first information and second information, and optionally further include alarm data and third information.

The first information is data generated by an end node, and passed to the network controller. The first information typically comprises information about a status of the end node (i.e. a status update or status information) or a parameter sensed by the end node (e.g. light level, temperature, moisture level etc.). Preferably, the first information is tolerant to packet loss, and may comprise, for example, one or more parity bits or bytes. The first information may be time insensitive and/or contain non-critical information. The first information is preferably provided at random times within in a predefined interval. For example, the first information may be provided six times a day, each day being divided into six, 4-hour timeslots. In each time slot, the first information may be provided at a random time. Alternatively, the first information is provided periodically (e.g. once an hour, once every half-hour) or on demand.

The second information is data generated by the network controller and passed to each end node (i.e. broadcast to the plurality of end nodes). The second information preferably comprises reconfiguration data to reconfigure or reprogram an operation of the plurality of end nodes. This may include a software update, new control parameters or a desired output for the one or more end nodes. Typically, the second information is provided in the form of more than one packet. There is a clear desire to ensure that such information is successfully passed to each end node.

The alarm data is (typically time-critical or time-sensitive) data generated by an end node and passed to the network controller. Alarm data is distinguished from first information in that the alarm data is of a higher priority than the first information, and should be reliably received by the network controller. The alarm data may occur on demand of the end node, and is usually indicative of an error or atypical state of the end node or input/output parameters. For example, a sensed temperature above a predetermined value may trigger an alarm, an error state of a luminaire may trigger an alarm or an incompatibility of the end node with the second information from the network controller may trigger an alarm. It will be apparent that there is a strong desire for such alarm data to be reliably sent to the network controller, as such data may be of high importance and be highly critical to the operation of the end node and/or the LWPAN. The network controller may be adapted to respond to the alarm data received from an end node (e.g. sending appropriate second information, adjusting communication parameters and so on).

The third information is data generated by the network controller and passed to one or more of the plurality of end nodes (i.e. unicast or multicast to one or more of the plurality of end nodes). This distinguishes it from the second information, which is broadcast to all end nodes. The third information may, for example, comprise instructions to alter operating parameters or output parameters of the end node.

In a first operating mode (a working mode or transmitting mode), the end node 3 is adapted to transmit the first information, generated at the end node, to the network controller 2. The first information may be iteratively transmitted at periodic intervals or at a random time within a periodic, predefined time interval. Thus, there may be repeated windows or timeslots in which each end node is required to transmit first information, the first information being transmitted at a random time within each window or timeslot. For example, the end nodes may be required to transmit first information 6 times a day. Each end node will divide this 24-hour period of time into six timeslots of four hours. In each timeslot, each end node will select a random time to transmit the first information.

The predefined time interval or periodic interval may be estimated by the throughput of the network, user requirements, the packet loss rate and so on.

It has previously been described how a packet loss rate may be calculated based on the traffic load and the medium access control mechanism, i.e. the configuration of the LPWAN, (which influences throughput). In one example, the traffic load may be calculated based upon the time required to transmit first information from an end node, the total number of end nodes and a length of the repeated timeslots in which end nodes are required to send the first information.

Using the example of the ALOHA medium access control system, a throughput (S) is calculated as:

$$S = Ge^{-2G} \quad (1)$$

where G is the traffic load. Consider a scenario in which end nodes are required to send first information within repeated 2000 second windows or timeslots (the first information being transmitted at a random time within each window or timeslot). If a packet time on air for the first information is 0.4 s (being the time required to transmit first information from a given end node to the gateway or the network controller), and there are 1000 end nodes, the total packet time of air is 400 s. The traffic load G is calculated by dividing the total packet time on air (400 s) by the available time to transmit the first information (being the length of the timeslot, 2000 s). Thus, the traffic load may be calculated as 0.2.

Using equation (1), the throughput S is calculated to be around 0.134.

The packet success rate is subsequently calculated by dividing the effective data transmission period by the total packet time of air (400 s). The effective data transmission period being the product of the calculated throughout S (0.134) and the available time to transmit the first information (length of the time slot, 2000 s), i.e. 268 s. Thus, the packet success rate is calculated as around 67%. The packet loss rate is therefore around 33%.

In a second operating mode (a restricted transmission mode), the end node 3 may be adapted to not transmit or be unable to transmit the first information to the network controller. In some embodiments, the end node may not generate the first information when operating in the second operating mode.

Thus, the method may comprise detecting the presence or absence of first information to determine whether an end node has correctly switched from/to the first operating mode (e.g. to/from the second operating mode). This provides a method of determining whether an operating mode has been correctly switched without the need to actively inquire or ask the end nodes whether they have switched operating mode, thereby lessening a burden on traffic load of the LPWAN. Rather, a passive determination as to whether the end nodes have correctly switched mode may be performed.

Moreover, the proposed methods allow end nodes to be switched between a transmitting mode (first operating mode) and a restricted transmission mode (second operating mode). Thus, a network controller 2 may control the amount of traffic on the network by, for example, preventing end nodes from transmitting first information by switching them to the second operating mode. This is particularly advantageous for lighting systems, as lighting systems may have a significant amount of data (e.g. current, voltage, temperature, current lighting state, ambient light level and so on) which said end nodes wish to transmit as first information. The excessive amount of data may overwhelm the LPWAN, and prevent higher priority messages from being transmitted or collide with update information from a network controller.

Preferably, in the second operating mode, the end node 3 is adapted to receive the second information, terminating at the end node, from the network controller 2. The second information may comprise, for example, data for reconfiguring the end node or adjusting output characteristics of the end node. Thus the second operating mode may act as a configuration mode.

In some embodiments, when operating in the first operating mode, the end node is unable to receive the second information from the network controller.

Thus each end node may switch between a first mode comprising transmitting the first information (and not receiving the second information) and a second mode comprising receiving the second information (and not transmitting the first information).

In this way, each end node may be provided with the capability of transmitting and receiving data, whilst being switchable between a substantially transmitting only and substantially receiving only mode. Thus, downlink and uplink traffic may be balanced and a power consumption of each end node may be minimized without affecting the capabilities of each end node to transmit and/or receive information to/from the network controller.

For example, a transmitter of an end node may be substantially powered down when the end node is operating in the second operating mode.

In some applications, such as lighting systems, there is strong desire for enabling end nodes to reliably transmit and receive data. By way of example, a luminaire may wish both to receive control/scheduling instructions (e.g. to control or schedule a light output) and be able to send an accurate status report to a network controller. A conventional LPWAN system may be unable to reliably provide this capability due to at least packet collision concerns between data for receipt by the end nodes and data transmitted by the end nodes. Proposed embodiments overcome this concern by providing end nodes operable in a transmitting mode (first operating mode) and a receiving mode or restricted transmitting (second operating mode), to thereby reduce traffic in the LPWAN.

Preferably, the end node is capable of outputting alarm data when operating in either one of the first or second operating mode. This would allow for critical information, time critical information in particular, to be transmitted by an end node regardless of an active operating mode of the end node. Put another way, when in a restricted transmission mode (e.g. the second operating mode) the end node may still be capable of notifying the network controller of any alarms or potential hazards to the end node(s) or LPWAN. This is of particular advantage when end nodes comprise a luminaire, as such luminaires may be susceptible to overheating, for example.

Similarly, the end node may be capable of receiving the third information when operating in either operating mode. This would allow, for example, the network controller to individually control an end node without requiring the end node to be in the second operating mode. As the third information is only provided to a selected number of end nodes (i.e. rather than all), this may not significantly affect the overall traffic of the LPWAN.

The network controller is adapted to receive first information transmitted by an end node operating in the first operating mode and to broadcast second information for receipt by a plurality of end nodes operating in the second operating mode. Similarly, the network controller may be adapted to receive alarm data from the end nodes and/or unicast/multicast third information to a selected one or more end nodes of the plurality of end nodes.

The network controller is able to instruct a change of mode of the end nodes (via a mode change command) and optionally monitor which operating mode each end node is in (e.g. by monitoring a success of the mode change command).

For example, the network controller may wish to place the plurality of end nodes in the second operating mode in order to simultaneously communicate with all end nodes at once (rather than unicasting/multicasting). In another example, if there is a very high density (e.g. >25% of end nodes) of unicast requests to end nodes operating in the first operating mode, the network may ask all end nodes to change to the configure mode to avoid packet collision because of first information transmissions from the respective end nodes.

Thus, if a traffic load on a LPWAN network is above a predetermined threshold (e.g. 75% of maximum traffic), the network controller may instruct the plurality of end nodes to enter a restricted transmission mode (second operating mode). In another scenario, if the network controller wishes to simultaneously update all end nodes (e.g. with new software or new operating parameters), rather than individually addressing each end node with third information, the network controller may instruct end nodes to enter the second operating mode and subsequently broadcast appropriate second information to the end nodes.

With continued reference to FIG. 2, in an embodiment, the step 22 of determining by the network controller 2 whether each of the plurality of end nodes has successfully switched operating mode may vary depending upon an expected operating mode of the end nodes or a previous operating mode of the end nodes.

Consider a first scenario in which a broadcast mode change command instructs end nodes to switch away from the first operating mode. In the event that the network controller 2 receives first information from any of the end nodes 3, 4, 5, it means at least one of the end nodes 3, 4, 5 continues to operate in the first operating mode, and has not successfully switched operating mode. In this scenario, the network controller should therefore rebroadcast in step 23 the mode change command.

In a second scenario, a broadcast mode change command has instructed end nodes to switch (e.g. from the second operating mode) to the first operating mode. The network controller may record which end nodes or how many end nodes have correctly changed mode by monitoring the first information received from the end nodes. For example, the network controller may tally or count how many end nodes have successfully transmitted first information to the network controller (for example, within a predetermined time window). The tallied number of end nodes may be compared to a known number of end nodes connected to the system. If the tallied number of end nodes is less than the known number, it is assumed that not all end nodes have correctly changed mode, and the mode change command should therefore be rebroadcast in step 23. The predetermined time window may be arbitrarily chosen (e.g. 1 minutes, 10 minutes, 30 minutes) or determined based upon a known or otherwise predetermined (maximum) time period between successive transmissions of the first information from the end nodes.

Thus, the presence or absence of data communication from an end node is used to determine whether the end node has correctly switched to the desired operating mode.

In particular, the presence or absence of first information is indicative of whether a first operating mode has been successfully entered or left the first operating mode. In particular, the presence of a particular data communication from an end node when the desired operating mode is the second operating mode may indicate that the end node has not correctly switched operating mode. Similarly, the absence of a particular data communication from an end node when the desired operating mode is the first communication mode also indicates that the end node has not correctly switched operating mode.

Figure 4:
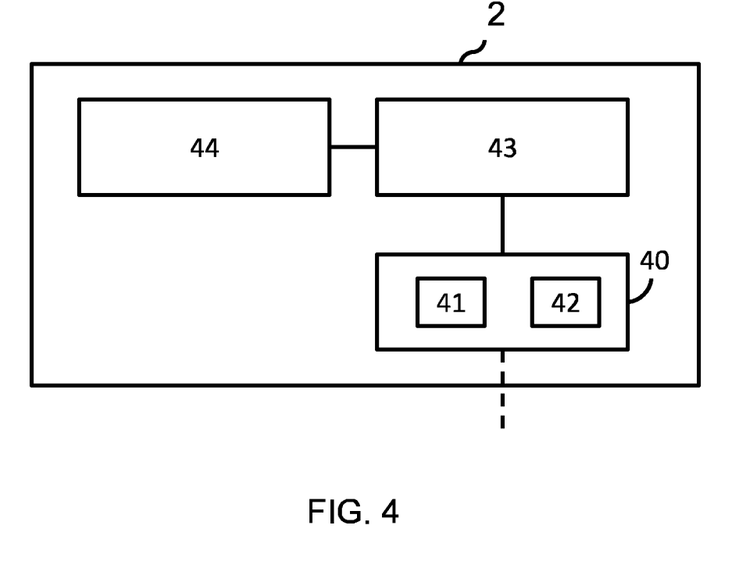
FIG. 4 illustrates a network controller according to an embodiment.

FIG. 4 illustrates an embodiment of a network controller 2. The network controller 2 is adapted to control the operating mode of the end nodes 3, 4, 5.

The network controller 2 comprises a transmitter 41 adapted to broadcast data to the plurality of end nodes. In particular, the transmitter is adapted to broadcast at least a mode change command instructing each end node to switch to a desired operating mode. The transmitter may also be adapted to transmit the second information and optionally third information to the end nodes.

The receiver 42 is adapted to receive data transmitted from each end node, such as first information and optionally alarm data. The transmitter 41 and the receiver 42 may form part of a transceiver 40.

The network controller 2 may also comprise a processor 43, which is adapted to generate data for transmission to the plurality of end nodes, including the mode change command.

The processor 43 comprises a detector for determining whether the plurality of end nodes have successfully switched to the desired operating state in response to the mode change command. This may be performed based on data (or lack of data) received at the receiver. In particular, the detector/processor 43 may perform a method previously described to determine whether each end node has successfully switched to the desired operating state.

The network controller 2 may also comprise a memory 44, for example, to store data received from the plurality of end nodes and/or to store program instructions to be carried out by the detector and/or processor 43.

In at least one embodiment, the transmitter 41 is adapted to also be capable of individually communicating with a single end node (e.g. using an addressing system). This may allow the network controller to unicast to identified end nodes.

When the end node 3 is operating in the first operating mode, the network controller 2 receives first information from the end node. The first information may comprise, for example, a status update or report of current operating parameters of the end node.

When the end node 3 is operating in the second operating mode, the network controller 2 is able to successfully transmit second information to the end node (as well as to other end nodes operating in the second operating mode). The second information may comprise, for example, new output parameters for the end node or reconfiguration instructions of the end node.

Figure 5:
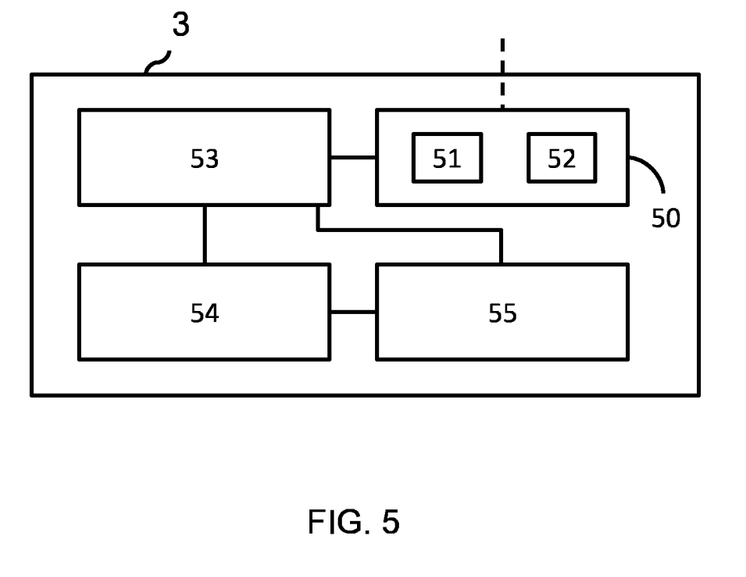
FIG. 5 illustrates an end node according to an embodiment.

FIG. 5 illustrates an embodiment of an end node 3.

The end node 3 comprises a receiver 51 configured to receive data, including the mode change command, from the network controller 2. The receiver receives second information from the network controller when the end node is operating in the second operating mode.

The end node 3 also comprises a processor 53 configured to switch operating mode based on the mode change command. That is, the processor may switch to an operating mode specified or indicated by the mode change command.

The end node 3 also comprises a transmitter 52. The transmitter 53 is adapted to output the first information (when the end node is in the first operating mode) and optionally the alarm data. The transmitter 52 and the receiver 51 may be formed together as a transceiver 50.

The end node 3 comprises an input/output unit 55. Here, the input/output unit 55 is a lamp adapted to output light. The characteristics of the light output by the end node may be controlled based on the second information received from the network controller (via the receiver 51). Thus, the second information may, for example, be an instruction to adjust an intensity, color, temperature, angle, dispersion characteristics, shape, number of active lamps, on/off state and so on of the lamps. The second information may comprise scheduling instructions for characteristics of the lamp (e.g. an on/off time for the lamp).

The skilled person will appreciate that other end nodes may comprise other input/output units. Generally, the term "input/output unit" indicates that the unit is adapted to output sensory or control information externally to the end node (e.g. output light, sound, touch etc. or control a pacemaker, medicinal drip etc.) and/or determine information about an immediate environment (e.g. temperature, ambient light, presence of certain gases, water flow/usage, electricity flow/usage, pulse rate of a user and so on). Thus, the input/output unit may, for example, comprise a water/electricity meter, a temperature sensor, a moisture sensor, a gas sensor, a pulse rate monitor and so on.

The processor 53 may also generate the alarm data and/or the first information for transmission by the transmitter 52. Generation of the first information and/or alarm data may be performed, for example, based on a sensed or operating characteristic of the input/output unit. By way of example, if an end node enters an error state or if an end node cannot comply with instructions contained in second information, alarm data may be transmitted to the network controller.

A memory 54 may be adapted to store readings from the input/output unit (e.g. temperature readings, water meter readings and so on) or control characteristics (e.g. desired output light level, color, temperature, intensity, angle and so on) for the input/output unit. The control characteristics may be defined by the second information received from the network controller 2. The memory 54 may store program instructions to be carried out by the processor 53.

Figure 6:
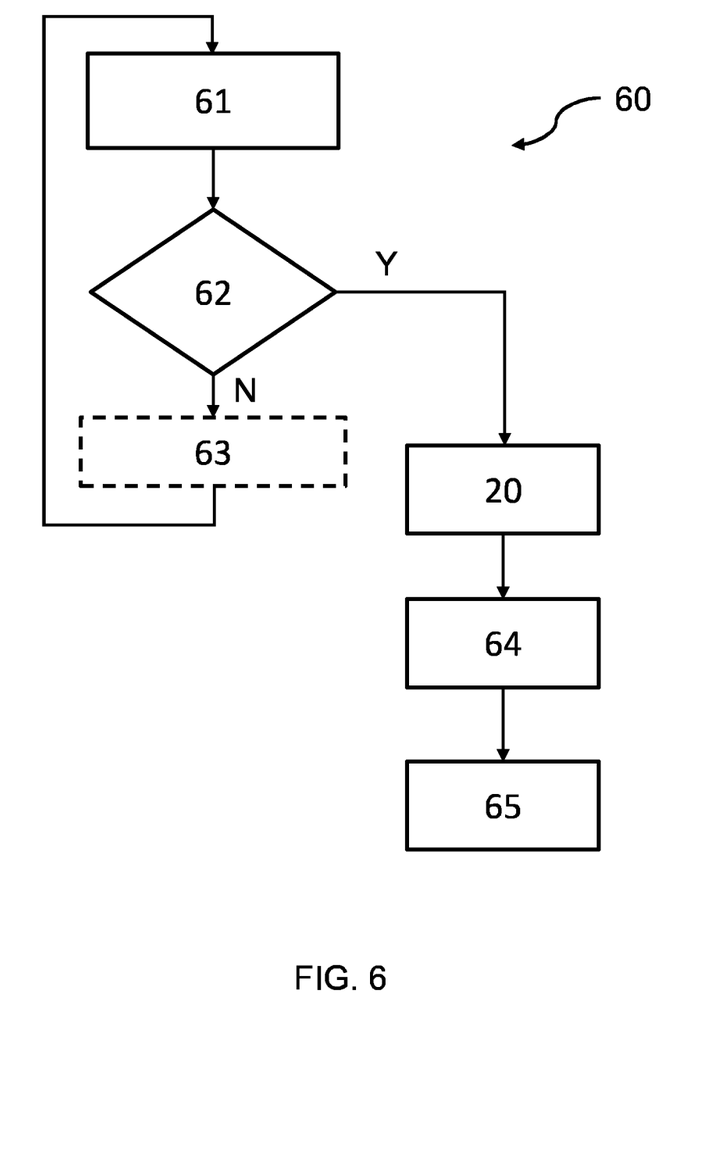
FIG. 6 illustrates a method of broadcasting information to a plurality of end nodes according to an embodiment.

FIG. 6 illustrates a method 60 of broadcasting second information to the end nodes. This method 60 is performed by the network controller 2.

The method 60 comprises a sub-step 61 of broadcasting the second information to the end nodes and a sub-step 62 of determining whether the second information has been broadcast at least a second predetermined number (P2) of times.

Preferably, the second predetermined number of times P2 is calculated in a similar manner to the first predetermined number of times (as previously described). In at least one embodiment, the second predetermined number of times P2 is identical to the first predetermined number of times.

In response to determining that the second information has been broadcast less than P2 times, the second information is broadcast 61 again. Optionally, the method may comprise waiting in step 23 for a third predetermined time interval (T3) between each sub-step 61 of broadcasting the second information.

Preferably, the third predetermined time interval T3 is based on a round trip time of data transmission in the LPWAN (e.g. a time for data to pass from the end node to the network controller and back again). In particular, it would be preferable for the third predetermined time interval T3 to be greater than 5 times the round trip time. This would allow for urgent messages (such as alarm data) to be transmitted to the network controller (and optionally be acknowledged) during this time interval, without the risk of packet collision.

In at least one embodiment, the end nodes are adapted to respond to a broadcast received from the network controller. This provides further incentive for the third predetermined time period T3 to be greater than a round trip time in the LPWAN, to ensure there is no packet collision between a broadcast of second information and a response of an end node (e.g. to a previous broadcast of the second information).

In some embodiments, the third predetermined time interval T3 is substantially (or exactly) the same as the second predetermined time interval T2. This may simplify an operation of the network controller 2, as both the second information and the mode change command may be repeatedly broadcast with a same interval between each broadcast. Similarly, the second predetermined number of times P2 may be substantially (or exactly) the same as the first predetermined number of times P1 for at least the same reasons.

In response to determining that the second information has been broadcast at least P2 times, the second information is no longer broadcast. The method 60 may comprise subsequently broadcasting in step 20 a mode change command to the end nodes 3, 4, 5, the mode change command being an instruction for the end nodes to switch to the first operating mode. This step 20 includes the sub-steps described with reference to FIGS. 2 and 3.

Thus, second information is repeatedly broadcast to the end nodes for a second predetermined number of times with a third predetermined time interval between each broadcast.

No response is necessary from the end nodes during the steps of broadcasting in step 60 the second information and broadcasting the mode change command. This reduces the likelihood of packet collisions (and/or lost data) in the LPWAN.

After broadcasting in step 20 the mode change command, the method 60 may comprise monitoring in step 64 first information (e.g. status updates) received from the end nodes now operating in the first operating mode. The network controller 2 may determine whether any of the end nodes have not responded to second information as expected (e.g. not correctly changed output or other operating parameters) based on the first information.

In response to determine that at least one end node has not responded to the second information as expected, the method 60 may comprise unicasting or multicasting third information, comprising data contained in the previously broadcast second information, to the at least one end nodes that have not responded (i.e. selected end nodes). This may include, for example, unicasting or multicasting a mode change command to these selected end nodes, unicasting or multicasting third information containing data previously broadcast as second information to the selected end nodes, and subsequently unicasting or multicasting another mode change command to the selected end nodes.

Figure 7:
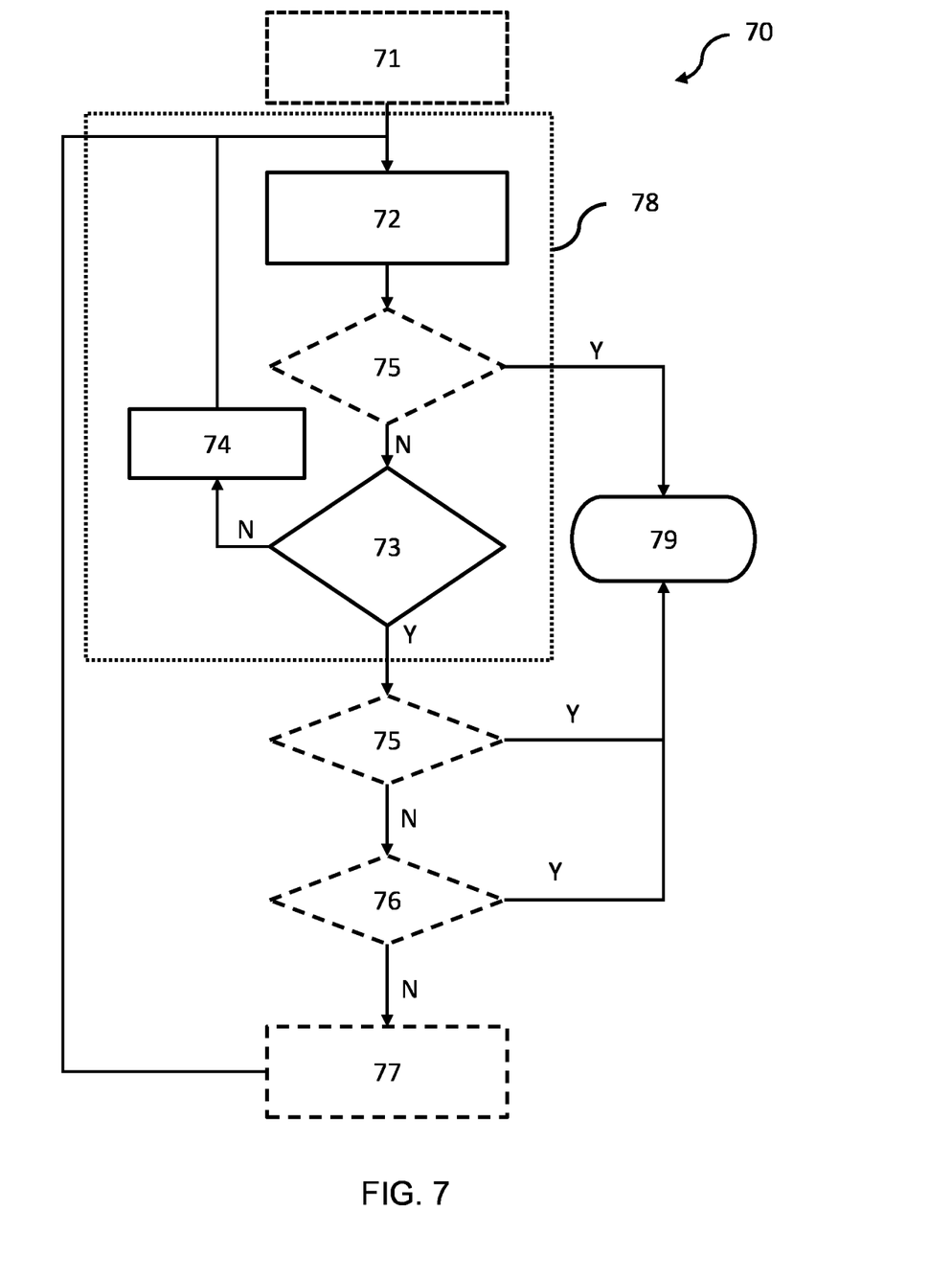
FIG. 7 illustrates a method of transmitting alarm data according to an embodiment.

FIG. 7 illustrates a method of transmitting alarm data to the network controller 2. The transmitting of alarm data may occur whilst the end node 3 is operating in either one of the first operating mode or the second operating mode.

The method 70 may comprise a step 71 of generating the alarm data for transmission. As previously explained, this may be performed by the processor 53 of the end node 3.

The method 70 comprises a step 72 of transmitting the alarm data to the network controller. This is performed by the transmitter 51 of the end node 3.

When transmitting alarm data to the network controller, the end node may be adapted to repeat transmission of the alarm data several times. Preferably, the alarm data is retransmitted a third predetermined number of times with a short, fourth predetermined time interval (e.g. around 5 seconds) between each transmission. Thus, a sequence of a predetermined number of repeated alarm data transmissions is made from the end node to the network controller, with a predetermined interval (e.g. around 5 seconds) between each alarm data transmission.

To this end, the method 70 may comprise a step 73 of determining whether the alarm data has been transmitted a third predetermined number of times P3. In the event that the alarm data has not been transmitted a third predetermined number of times, the method 70 comprises a step of waiting for a fourth predetermined time interval T4 (i.e. period of time) transmitting, in step 72, the alarm data again. The third predetermined number of times may be calculated in a similar manner to the first and/or second predetermined number of times. In some embodiments, the third predetermined number of times is identical to the first and/or second predetermined number of times.

Preferably, the fourth predetermined time interval T4 between the transmissions is greater than a round trip time (i.e. a time for data to pass from the end node to the network controller and back again). This allows for prevention of packet collision with a possible (unicast) response from the network controller. Even more preferably, the fourth predetermined time period T4 is no more than double the length of the round trip time, to ensure that alarm data is quickly provided to the network controller.

Preferably, the second T2 and/or third T3 predetermined time period is greater than the fourth predetermined time period. In this way, a packet collision between a mode change command and/or second information issued by the network controller and the alarm data, may be avoided. By way of example, the second and/or third predetermined time period may be around four times greater than the fourth predetermined time period.

The steps of transmitting 72, checking 73 and waiting 74 may thereby comprise a single, overall sequence 78 of repeated alarm data transmissions.

In at least one embodiment, a plurality of such sequences of repeated alarm data transmissions is transmitted by the end node with a large interval (e.g. around 15 minutes) between each sequence of repeated alarm data transmissions.

That is, the method may comprise a step 76 of determining whether the sequence of repeated alarm data transmissions has been performed at least a fourth predetermined number of times. In response to the sequence of repeated alarm data transmissions being performed less than the fourth predetermined number of times, the method comprises, in step 76, waiting for a fifth predetermined time period (e.g. around 15 minutes) before transmitting in steps 72, 73, 74 another sequence of repeated alarm data transmissions. Otherwise, the method ends in step 79.

The fifth predetermined time period may depend upon an urgency of the alarm. For a more urgent alarm the fifth predetermined time period by be less than for a less urgent alarm. By way of example, the fifth predetermined time period for a very urgent alarm may be around five minutes, whereas the fifth predetermined time period for a less urgent alarm may be around fifteen minutes. The urgency of the alarm may be determined based upon a priority of the alarm data.

The method may comprise checking 75 whether an acknowledgment signal has been received from the network controller. In response to an acknowledgement signal, the method 70 of transmitting alarm data ends in step 79.

Thus, when transmitting alarm data, the end node may be adapted to monitor (e.g. using the receiver 52) for an acknowledgment signal. This will ensure that all alarm messages are successfully transferred to the network controller.

The step 75 of checking for an acknowledgment signal may be performed, for example, during each repetition 72, 73, 74 of the alarm data transmission in a sequence or after all alarm data transmissions in a sequence have been transmitted (i.e. between repetitions of the sequences).

The network controller 2 is adapted to monitor for alarm data, and provide an acknowledgment signal to the end node providing alarm data. Preferably, the network controller unicasts the acknowledgement signal to the end node providing the alarm data, using the transmitter 41.

As previously identified, when operating in the second operating mode, the end node may be adapted to transmit alarm data to the network controller. This may be done in the same manner as that described for the first operating mode.

Embodiments are particularly advantageous when employed in a dispersed lighting application, such as a city or street lighting system. It has been recognized that such systems benefit particularly from all end nodes being controlled or updated simultaneously (i.e. using the broadcast mode change command or the second information), in order to maintain a consistent lighting level throughout an infrastructure environment (e.g. along a particular street).

In such embodiments, the first information transmitted by the end nodes may include status information of a luminaire of an end node, detailing, for example, a current, a voltage, a temperature, a current lighting level, a time since power on, and so on.

Preferably, in a lighting system according to an embodiment, each end node is adapted to operate in a (freely) transmitting mode (first operating mode) and a restricted transmitting mode (second operating mode). In the (freely) transmitting mode, the end node is able to transmit status information (i.e. first information) to the network controller, and may perform this at regular intervals. In the restricted transmitting mode, the end node does not perform a regular transmittal of the status information, but rather is restricted to transmitting only critical information (such as alarm data). Of course, this critical information may also be transmitted when the end node is operating in the transmitting mode.

The network controller of a lighting system is adapted to switch the end nodes (comprising luminaires) between the transmitting mode and the restricted transmitting mode. Thus, the network controller is adapted to control whether end nodes transmit first information, being status information, and may thereby control a traffic flow or amount of traffic in the network.

Embodiments have generally described an end node operable in at least a first operating mode (transmitting mode) and a second operating mode (restricted transmitting mode). It will be apparent that the end nodes may operate in any plurality of operating modes, and that end nodes are not restricted to the operating modes herein described.

As discussed above, embodiments make use of a network controller. The network controller can be implemented in numerous ways, with software and/or hardware, to perform the various functions required. A processor is one example of a network controller which employs one or more microprocessors that may be programmed using software (e.g., microcode) to perform the required functions. A network controller may however be implemented with or without employing a processor, and also may be implemented as a combination of dedicated hardware to perform some functions and a processor (e.g., one or more programmed microprocessors and associated circuitry) to perform other functions.

Examples of network controller components that may be employed in various embodiments of the present disclosure include, but are not limited to, conventional microprocessors, application specific integrated circuits (ASICs), and field-programmable gate arrays (FPGAs).

In various implementations, a processor or network controller may be associated with one or more storage media such as volatile and non-volatile computer memory such as RAM, PROM, EPROM, and EEPROM. The storage media may be encoded with one or more programs that, when executed on one or more processors and/or network controllers, perform the required functions. Various storage media may be fixed within a processor or network controller or may be transportable, such that the one or more programs stored thereon can be loaded into a processor or network controller.

As used herein, the term 'broadcast' is used to refer to a same communication from the network controller to all end nodes managed by the network controller. The term 'multicast' is used to refer to a communication to a plurality of (but not necessarily all) end nodes managed by the network controller. The term 'unicast' is used to refer to a communication from the network controller to a single one of the end nodes managed by the network controller (e.g. using an addressing or other identification system).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of managing a plurality of end nodes of a Low-Power Wide Area Network, LPWAN, wherein each end node is switchable between at least two operating modes, the method comprising:
   broadcasting a mode change command to the plurality of end nodes, wherein the mode change command indicates a desired operating mode of the plurality of end nodes;
   determining, by a detector of a network controller, whether at least one end node has not successfully switched into the desired operating mode in response to the mode change command; and
   in response to the detector determining that at least one end node has not switched into the desired operating mode, rebroadcasting the mode change command;
   wherein the at least two operating modes comprise at least:
   a first operating mode in which the end node transmits first information, generated at the end node, to the network controller; and
   a second operating mode in which the end node does not transmit the first information to the network controller;
   the step of determining comprising
   determining whether each of the plurality of end nodes has successfully switched into the desired operating mode in response to the mode change command based on whether the first information from each of the plurality of end nodes is received by the network controller or not, wherein, when the desired operating mode is the first operating mode, the detector is configured to determine that the at least one end node has not successfully switched into the desired operating mode if the first information is not received by the network controller from the at least one end node and wherein, when the desired operating mode is the second operating mode, the detector is configured to determine that the at least one end node has not successfully switched into the desired operating mode if the network controller receives the first information from the at least one end node.

2. The method of claim 1, wherein the broadcasting comprises repeatedly broadcasting the mode change command a predetermined number of times, wherein the predetermined number is calculated based on at least one characteristic of the LWPAN, such as the packet loss rate.

3. The method of claim 1, wherein if the mode change command indicates a desire to switch away from the first operating mode: the method comprises determining whether any one or more of the plurality of end nodes continues to transmit the first information to the network controller, so as to determine whether each of the plurality of end nodes has successfully switched to the desired operating mode.

4. The method of claim 1, wherein if the mode change command indicates a desire to switch to the first operating mode: the method comprises determining whether any one or more of the plurality of end nodes has failed to transmit the first information to the network controller within a predetermined time window, so as to determine whether each of the plurality of end nodes has successfully switched to the desired operating mode.

5. The method of claim 1, wherein if the mode change command indicates a desire to switch the plurality of end nodes to the second operating mode, the method further comprises:
   transmitting second information to each of the plurality of end nodes;
   broadcasting a second mode change signal command, the second mode change signal command indicating a desire to switch the end node to the first operating mode;
   receiving first information from each of the plurality of end nodes;
   determining, based on the received first information, whether the second information was correctly received by each of the plurality of end nodes, wherein an end node operating in the second operating mode is adapted to receive the second information.

6. A computer program comprising code for implementing the method of claim 5 when said program is run on a computer.

7. The method of claim 1, wherein, when the desired operating mode is the first operating mode, the detector is configured to determine that the at least one end node has successfully switched into the desired operating mode based on the network controller receiving the first information from the at least one end node and wherein, when the desired operating mode is the second operating mode, the detector is configured to determine that the at least one end node has successfully switched into the desired operating mode based on the absence of the first information from the at least one end node.

8. A network controller for managing a plurality of end nodes of a Low-Power Wide Area Network, LPWAN, wherein each end node is switchable between at least two operating modes, the network controller comprising:
- a transmitter configured to broadcast at least a mode change command to the plurality of end nodes, wherein the mode change command indicates a desired operating mode of the plurality of end nodes;
- a detector configured to determine whether at least one end node has not successfully switched into the desired operating mode in response to the mode change command; and
- wherein, in response to the detector determining that the at least one end node has not switched to the desired operating mode, the transmitter is configured to rebroadcast the mode change command; wherein the at least two operating modes comprise at least:
- a first operating mode in which the end node transmits first information, generated at the end node, to a network controller; and
- a second operating mode in which the end node does not transmit the first information to the network controller;
- the detector is further configured to determine whether each of the plurality of end nodes has successfully switched into the desired operating mode in response to the mode change command based on whether the first information from each of the plurality of end nodes is received by the network controller or not, wherein, when the desired operating mode is the first operating mode, the detector is configured to determine that the at least one end node has not successfully switched into the desired operating mode if the first information is not received by the network controller from the at least one end node and wherein, when the desired operating mode is the second operating mode, the detector is configured to determine that the at least one end node has not successfully switched into the desired operating mode if the network controller receives the first information from the at least one end node.

9. The network controller of claim 8, wherein the transmitter is configured to broadcast the mode change command a predetermined number of times, wherein the predetermined number is calculated based on at least a characteristic of the LWPAN, such as a packet loss rate.

10. The network controller of claim 9, wherein if the mode change command indicates a desire to switch from the first operating mode:
- the detector is adapted to determine whether any one or more of the plurality of end nodes continues to transmit first information to the network controller, so as to determine whether each of the plurality of end nodes has successfully switched to the desired operating mode.

11. The network controller of claim 9, wherein if the mode change command indicates a desire to switch to the first operating mode:
- the detector is adapted to determine whether any one or more of the plurality of end nodes has failed to transmit first information to the network controller within a predetermined time interval, so as to determine whether each of the plurality of end nodes has successfully switched to the desired operating mode.

12. The network controller of claim 8, wherein each end node comprises a luminaire adapted to output light and the first information comprises a light control signal for controlling an output light of the luminaires of the end nodes.

13. An end node for a Low-Power Wide Area Network, LPWAN, comprising:
- a receiver adapted to receive at least a mode change command from a network controller according to claim 8;
- a transmitter adapted to transmit data to the network controller; and
- a processor adapted to switch the end node between at least two operating modes based on the mode change command, wherein the end node is switchable between at least: a first operating mode in which the end node primarily transmits first information, generated at the end node, to the network controller; a first operating mode in which the end node transmits first information, generated at the end node, to a network controller; and a second operating mode in which the end node does not transmit the first information to the network controller.

14. A network system comprising: the network controller of claim 8.

15. The network controller of claim 8, wherein, when the desired operating mode is the first operating mode, the detector is configured to determine that the at least one end node has successfully switched into the desired operating mode based on the network controller receiving the first information from the at least one end node and wherein, when the desired operating mode is the second operating mode, the detector is configured to determine that the at least one end node has successfully switched into the desired operating mode based on the absence of the first information from the at least one end node.

\* \* \* \* \*